No. 794,874. PATENTED JULY 18, 1905.
G. S. MAYHEW.
ASSEMBLING MACHINE FOR FORMING A CONTINUOUS COMPO BOARD.
APPLICATION FILED NOV. 23, 1904.

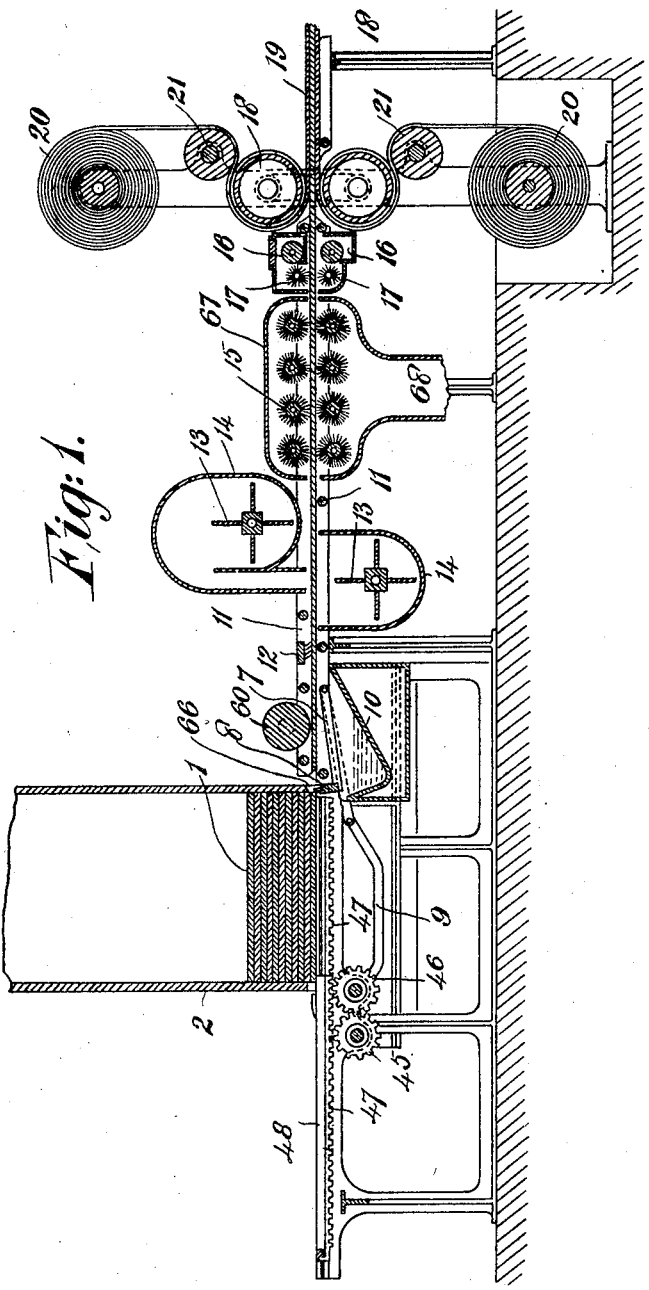

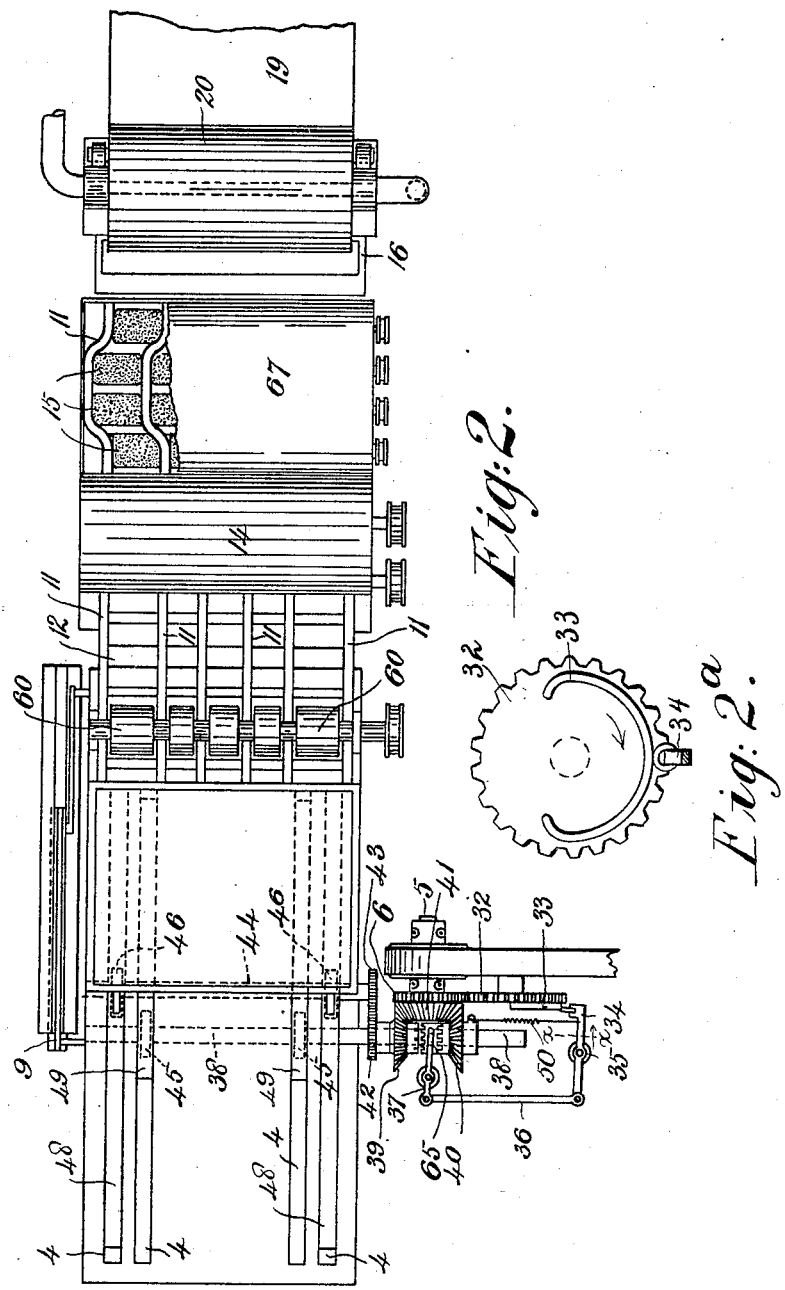

Witnesses
Edwin D. Bartlett
H. E. Cushman

Inventor.
George Sprigats Mayhew
per
Attorney.

No. 794,874. PATENTED JULY 18, 1905.
G. S. MAYHEW.
ASSEMBLING MACHINE FOR FORMING A CONTINUOUS COMPO BOARD.
APPLICATION FILED NOV. 23, 1904.
4 SHEETS—SHEET 4.
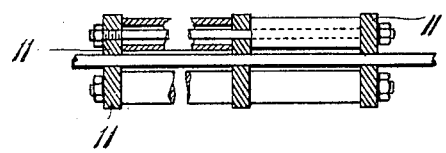
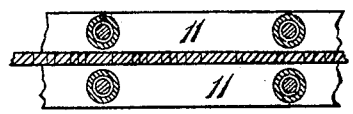
*Fig: 5.*  *Fig: 6.*
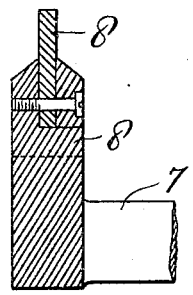
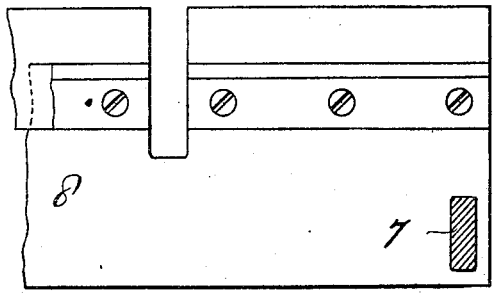
*Fig: 7.*  *Fig: 8.*
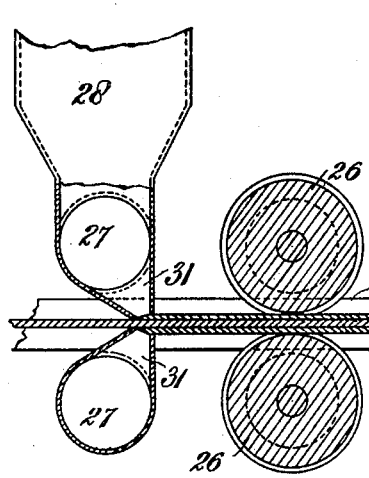
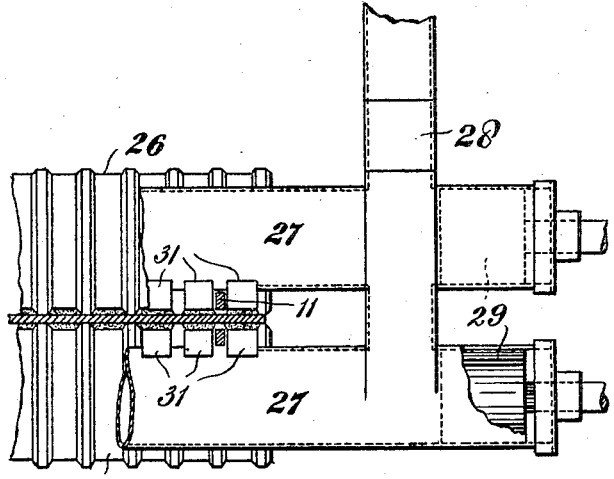
*Fig: 9.*  *Fig: 10.*
Witnesses
Edwin D. Bartlett
H. A. Cushman
Inventor,
George Skapts Mayhew,
per Henry Calver
Attorney.

No. 794,874. Patented July 18, 1905.

UNITED STATES PATENT OFFICE.

GEORGE SKAATS MAYHEW, OF LONDON, ENGLAND, ASSIGNOR TO GEORGE WILLIAM MELLOR, OF LONDON, ENGLAND.

ASSEMBLING-MACHINE FOR FORMING A CONTINUOUS COMPO-BOARD.

SPECIFICATION forming part of Letters Patent No. 794,874, dated July 18, 1905.

Application filed November 23, 1904. Serial No. 233,979.

*To all whom it may concern:*

Be it known that I, GEORGE SKAATS MAYHEW, a citizen of the United States of America, residing at 2 Basinghall avenue, in the city and county of London, England, have invented a new and useful Improved Assembling-Machine for Forming a Continuous Compo-Board, of which the following is a specification.

My invention relates to machines for assembling the planks cut from the compound deals.

Compound or composition boards, commonly known in the trade as "compo-boards," consist, essentially, of a core or sheet of wood composed of one or more layers or pieces of wood cemented together at their edges and inclosed between layers of thick paper or cardboard.

According to the present invention I have designed an assembling-machine in which the planks cut from the deal are joined, cemented, compressed, and faced with paper, veneer, or the like, and thereby formed into a continuous core by the successive steps of the machine.

My invention is more particularly described with reference to the accompanying drawings, in which—

Figures 1 and 2 show side sectional elevation and plan, respectively, of an assembling-machine with a paper-lining machine attached. Fig. 2ª is a detail view to show the cam 33 and its operative relation to the lever 34, said lever being represented in section on line $x\,x$, Fig. 2. Figs. 3 and 4 show sectional views of the spring-pusher head, Fig. 3 being a section on the line A B of Fig. 4. Figs. 5 and 6 show detail views of the grid-guides or table, and Figs. 7 and 8 show detail views of the glue-brush. Figs. 9 and 10 are detail views of an apparatus for feeding a cementing material to the compound board between the core and one or both of the paper faces.

The boards 1 are fed into the magazine 2 of the assembling-machine one above the other, said magazine being preferably arranged with an adjustable opening 66. Fresh boards are added continuously at the top as the bottom ones are successively pushed forward against the edge of the previous board by the double reciprocating clutch frame or pusher 48 49, which works in guides 4 and is operated by clutch mechanism driven from the main driving-shaft 5 in the following manner: The main driving-shaft 5 has mounted thereon a fixed gear-wheel 6, engaging with and driving a loose wheel 32, which preferably turns half a revolution to every revolution of the wheel 6. The wheel 32 carries a cam 33, which engages on every revolution with an arm 34, pivoted at 35 and connected to and operating an arm 36, connected to a pivoted arm 37, to which is attached the sliding clutch 65, mounted on a shaft 38 to rotate therewith. On the shaft 38 two loose bevel-wheels 39 and 40 are mounted, gearing with a fixed bevel-wheel 41, arranged at the end of the above-mentioned driving-shaft 5. On said shaft 38 a fixed gear-wheel 42 is arranged, said gear-wheel engaging with a fixed gear-wheel 43, arranged at the inner end of the shaft 44 parallel to a continuation of the above-mentioned shaft 38. On the reversely-rotating shafts 38 and 44 gear-wheels 45 and 46 are mounted, said gear-wheels engaging with racks 47, arranged on the lower surfaces of the alternately-acting clutches or pushers 48 49.

The operation of the above-described mechanism is as follows: When the cam 33 on the gear-wheel 32 pushes the pivoted lever 34 outward against the spring 50, the above-mentioned clutch 65 is brought into such a position as to lock the bevel-wheel 40 to the shaft 38, so that said shaft is driven by means of the main shaft 5 and its bevel-wheel 41, thereby moving the pusher 48 in one direction and driving the pusher 49 in the other direction through the gear-wheel 43 and the oppositely-rotating shaft 44. When, however, the said cam 33 is not in engagement with the lever-arm 34, the spring 50 pulls said lever-arm inward and operates the above-mentioned clutch to lock the bevel-wheel 39 to the shaft 38, thereby causing said shaft to be driven in the opposite direction by the main shaft 5 through its bevel-wheel 41, and so causing the pushers 48 and 49 also to move, respectively, in the opposite directions to the directions in which they moved when the shaft 38 was locked to the bevel-wheel 40. By this arrangement I am enabled to get a continuous forward drive for the planks passing from the magazine.

In Figs. 3 and 4 I show on an enlarged scale one of the clutch frames or pushers 48 49 for joining the boards as they pass out from the magazine 2 of the assembling-machine and moving them forward between the guides 11 of the machine. On the top piece of the pusher I arrange a claw 51, adapted to engage with the edge of the board as it leaves the magazine, said claw being pivoted at 52 and kept above the upper surface of the spring-controlled top piece 53 of the pusher by means of a projection 54, engaging with a spring-arm 55. When the pusher is on its return stroke, it will be readily understood that the weight of the boards 1 in the magazine presses the claw level with the upper face of the top piece 53 against the pressure of the spring-arm 55. At the farther end of the above-mentioned top piece I arrange a suitable rod 56, adapted to be adjusted by means of the nut 57, and between said top piece and a projection 58, extending up from the body of the rack 61 of the pusher, I arrange a spring 59, adapted to be compressed by the top piece supporting the claw when the pusher is moving forward and the claw 51 is in engagement with the edge of a board. The springs 59 must be strong enough to carry the board clear of the magazine and against the edge of the previous board before the springs are compressed. The actual pressure exerted to make the joint between the boards is taken up by the aforementioned springs.

Below the claw 51 I arrange an opening 62, as shown in Fig. 4, carried right across the pusher and adapted to register with similar holes in the framework of the machine when the pusher is at the end of its forward stroke. The object of this opening is to allow any chips or sawdust which may get in beneath the claw 51 to pass out from the pusher immediately, and so obviate any chance of said chips or sawdust getting beneath the claw and causing it to project above the surface of the top piece 53 on the return stroke of the pusher.

Just before each of the boards 1 is pushed forward from the magazine an arm 7, supporting a glue-wiper 8, (see Figs. 1, 7, and 8,) is operated by suitable mechanism 9 from the above-mentioned reciprocating clutch-frame to rise from a glue-tank 10, so that its wiper 8 comes against the edge of the board 1 and spreads over said edge a small amount of glue or the like. As the clutch-pusher comes forward the mechanism 9 is so adjusted that the arm 7 falls and allows the board to be pushed forward between upper and lower guides 11, which are formed as a grid and are shown more particularly in Figs. 5 and 6. A series of wheels 60, driven in any suitable manner, are arranged in front of the wiper, as shown, adapted to engage with the upper surface of the board and to carry it forward through the guides 11. A clutch 12 is arranged inside the above-mentioned upper guides 11, formed conveniently in the form of a wire brush or the like pressing against the surface of said board and allowing it to pass forward, but not to return. Mounted on said guides I arrange upper and lower dust-fans 13, (see Fig. 1,) adapted to pick up sawdust from the covers 14 and dust it over the newly-made glue joints formed between the boards in the said assembling-machine. In front of said fans I arrange a top and bottom series of brushes 15, staggered in order to cover the whole surface of the board, as shown in Fig. 2, adapted to carry the compo-board core through the machine and to brush off the superfluous glue which has been formed at the joints of the boards, the said glue having been previously dusted by the above-mentioned sawdust-fans. The brushes 15 are inclosed in a casing 67, to which is supplied hot air to dry the newly-made joints of the board or core and to carry off through the exhaust-opening 68 the sawdust and glue which have been removed by the brushes.

In front of the cleaning-brushes I arrange upper and lower paste-tanks 16, from which a coating of paste or cement is conveyed to the board passing through the machine by means of brushes 17, adapted to pick up the cement from the rollers immersed in the tanks 16. Beyond the paste-tanks I arrange upper and lower blanketed pressing-rollers 18, suitably heated and adapted, respectively, to press against and spread a lining of paper on the upper and lower faces of the board, the paper being fed from the paper-rolls 20 over the guiding-rollers 21 to the aforementioned pressing-rollers 18. The above-described pressing-rollers rotate at the same speed as the board and assist the progress thereof. It will be readily understood that as the whole weight of the top roller bears on the compo-board as it passes through the machine and presses it against the lower roller the top and bottom paper linings are pressed firmly against the board. The resulting core or finished board 19 coming from the said pressing-rollers can be trimmed at the edges and cut into lengths and further dealt with as needful.

It will be obvious that the machine as shown is designed for producing a board of one thickness; but if it is desired to alter the thickness the machine may be made adjustable, so that the mechanism may be raised above the board.

A special feature of the above-described process is the extremely small amount of cementing material requisite in consequence of the faces of the board or core being so perfectly smooth. Consequently the little moisture contained is readily absorbed by the highly-dried board and paper faces without causing any damage or swelling in the structure of the finished product.

If a heavier and more rigid board is required—for instance, in the manufacture of a very stiff partition lining or board for ceilings or for more or less fireproof divisions—a somewhat different method of assembling is necessary. In constructing this heavier board it is necessary to interpose a thick coating of cementing material between the core and one or both of the paper faces. A machine for carrying out this process is shown in Figs. 9 and 10, in which the thick paste or cementing material is fed onto the board from upper and lower cement-tanks 27 through spouts 31. The tanks are joined by a common funnel 28, through which the paste is introduced. At the end of the tanks plungers 29 are arranged, adapted to come forward and force the paste out through the spouts 31 in said tanks against the upper and lower faces of the board. After the paste has been fed onto the board the latter passes between grooved rollers 26, which form the cementing material on the faces of the board into ridges or rows corresponding with the grooves of the rollers, while the intervening spaces correspond to the projecting parts of the rollers. These ridges or rows of cement are leveled by pressing-rollers when the board passes between them and receives its upper and lower face of paper, said cement being squeezed out over the whole surface of the paper and firmly pressed upon the core to an amount corresponding to the setting of said lining-rollers and the quality of the cementing material.

What I claim is—

1. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, means for gluing respectively the edges of each of said board-sections before it is passed from the magazine, guides for supporting said board-sections while passing through the machine, means for dusting sawdust over the joints formed between said board-sections, means for cleaning said board-sections of superfluous glue after having been joined into a continuous sheet and dusted, means for covering the faces of said continuous sheet with cement and means for lining the faces of said sheet with a suitable lining, substantially as described.

2. In an assembling-machine for forming continuous sheets of compo-board, a magazine for receiving board-sections, double spring-controlled reciprocating pushers for feeding each of said board-sections separately from the magazine through the machine against the edge of the previous board-section passed from the magazine and for controlling the amount of pressure used in making the joints between said board-sections, means for operating said pushers, means for gluing respectively the edges of each of said board-sections before it is passed from the magazine, guides for supporting said board-sections while passing through the machine, means for dusting sawdust over the joints between said board-sections, means for cleaning said board-sections of superfluous glue after having been joined into a continuous sheet and dusted, means for covering the faces of said continuous sheet with cement and means for lining the faces of said sheet with a suitable lining, substantially as described.

3. In an assembling-machine for forming continuous sheets of compo-board, a magazine for receiving board-sections, a plurality of spring-controlled pushers adapted to reciprocate in opposite directions and to feed said board-sections continuously from the magazine forward through the machine against the edges of the previous board-sections passed from the magazine and to control the amount of pressure used in making the joints between said board-sections, gear-wheels mounted on shafts engaging with racks arranged on said pushers, clutch mechanism for operating said shafting, cam-and-lever mechanism for operating said clutch mechanism so as to move one set of said pushers forward at the same time as moving the other set of said pushers backward, means for gluing respectively the edges of each of said board-sections before it is passed from the magazine of the machine, guides for supporting said board-sections while passing through the machine, means for dusting sawdust over the joints formed between said board-sections, means for cleaning said board-sections of superfluous glue after having been joined into a continuous sheet and dusted, means for covering the faces of said continuous sheet with cement and means for lining the faces of said sheet with a suitable lining, substantially as described.

4. In an assembling-machine for forming continuous sheets of compo-board, a magazine for receiving board-sections, a plurality of spring-controlled pushers adapted to reciprocate in opposite directions and to feed said board-sections continuously from the magazine forward through the machine against the edges of the previous board-sections passed from the magazine and to control the amount of pressure used in making the joints between said board-sections, spring-controlled claws mounted in spring-controlled top pieces of said pushers adapted to engage with the edges of said board-sections on the forward stroke of the pushers and to be pressed level with the upper surface of said top pieces by the weight of said board-sections on the return stroke of said pushers, gear-wheels mounted on shafts engaging with racks arranged at the bottoms of said pushers, clutch mechanism operating said shafting, a cam-and-lever mechanism operating said clutch mechanism so as to move one set of said pushers forward at the same time as moving the other set of said pushers backward, means for gluing respectively the edges of each of said board-sections before it is passed from the magazine, guides for supporting said board-sections while passing through the machine, means for dusting sawdust over the joints formed between said board-sections, means for cleaning said board-sections of superfluous glue after having been joined into a continuous sheet and dusted means for covering the faces of said continuous sheet with cement and means for lining the faces of said sheet with a suitable lining, substantially as described.

5. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, a glue-tank arranged in front of said magazine, an arm supporting a glue-wiper arranged in said tank, lever mechanism operated from said pusher mechanism to raise said glue-wiper against the edges of each of said board-sections before leaving the magazine, guides for supporting said board-sections while passing through the machine, means for dusting sawdust over the joints formed between said board-sections, means for cleaning said board-sections of superfluous glue after having been formed into a continuous sheet and dusted, means for covering the faces of said continuous sheet with cement and means for lining the faces of said sheet with a suitable lining, substantially as described.

6. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, a glue-tank arranged in front of said magazine, an arm supporting a glue-wiper arranged in said tank, lever mechanism operated from said pusher mechanism to raise said glue-wiper against the edges of each of said board-sections before leaving the magazine, guides formed as a grid for supporting said board-sections while passing through the machine, a wire brush-clutch arranged between the grids of said guides adapted to allow the board-sections to be passed forward but not to return, means for dusting sawdust over the joints formed between said board-sections, means for cleaning said board-sections of superfluous glue after having been formed into a continuous sheet and dusted, means for covering the faces of said continuous sheet with cement and means for lining the faces of said sheet with a suitable lining, substantially as described.

7. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, means for gluing respectively the edge of each of said board-sections before it is passed from the magazine, guides for supporting said board-sections while passing through the magazine, covers arranged above and below said guides, a series of fans mounted in said covers adapted to pick up sawdust from said covers and dust it over the joints formed between said board-sections, means for cleaning said board-sections of superfluous glue after having been formed into a continuous sheet and dusted, means for covering the faces of the said continuous sheet with cement and means for lining the faces of said sheet with a suitable lining substantially as described.

8. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, means for gluing respectively the edges of each of said board-sections before it is passed from the magazine, guides for supporting said board-sections while passing through the machine, covers arranged above and below said guides, a series of fans mounted in said covers adapted to pick up sawdust from said covers and dust it over the joints formed between said board-sections, a series of brushes arranged above and below said guides staggered in order to cover the whole surface of the continuous sheet formed from said board-sections and adapted to brush off the superfluous glue formed at the joints of said continuous sheet after having been dusted by said fans, means for covering the faces of said continuous sheet with cement and means for lining the faces of said sheet with a suitable lining, substantially as described.

9. In an assembling-machine for forming continuous sheets of compo-board, a magazine for receiving board-sections, double reciprocating pushers for feeding each of said board-sections separately from the magazine forward through the machine against the edge of the previous board-section passed from the magazine, means for operating said pushers, means for gluing respectively the edges of each of said board-sections before it is passed from the magazine, guides for supporting said board-sections while passing through the machine, means for dusting sawdust over the joints formed between said board-sections, means for cleaning said board-sections of superfluous glue after having been formed into a continuous sheet and dusted, cement-tanks arranged above and below said guides, means for conveying cement from said tanks to the faces of the said continuous sheet and means for lining the faces of said sheet with a suitable lining, substantially as described.

10. In an assembling-machine for forming continuous sheets of compo-board, a magazine for receiving the board-sections, double reciprocating pushers for feeding each of said board-sections separately from the magazine forward through the machine against the edge of the previous board-section passed from the magazine, means for operating said pushers, means for gluing respectively the edges of each of said board-sections before it is passed from the magazine, guides for supporting said board-sections while passing through the machine, means for dusting sawdust over the joints formed between said board-sections, means for cleaning said board-sections of superfluous glue after having been joined into a continuous sheet and dusted, cement-tanks arranged above and below said guides, means for conveying cement from said tanks to the faces of said continuous sheet, grooved rollers arranged above and below said guides for forming the cement into ridges on the faces of said sheet and means for lining the faces of said sheet with a suitable lining, substantially as described.

11. In an assembling-machine for forming continuous sheets of compo-board, a magazine for receiving the board-sections, double reciprocating pushers for feeding each of said board-sections separately from the magazine forward through the machine against the edge of the previous board-section passed from the magazine, means for operating said pushers, means for gluing respectively the edges of each of said board-sections before it is passed from the magazine, guides for supporting said board-sections while passing through the machine, means for dusting sawdust over the joints formed between said board-sections, means for cleaning said board-sections of superfluous glue after having been formed into a continuous sheet and dusted, cement-tanks arranged above and below said guides, means for conveying cement from said tanks to the faces of said continuous sheet, grooved rollers arranged above and below said guides adapted to form the cement on the faces of said sheet into ridges, heated rollers adapted to press against the cemented upper and lower faces of said sheet and to spread a lining of suitable material over said cemented faces and means for guiding said lining to said pressing-rollers, substantially as described.

In testimony whereof I have signed my name to this specification in the presence of two subscribing witnesses.

GEORGE SKAATS MAYHEW.

Witnesses:
ARTHUR J. STEPHENS,
LEONARD E. HAYNES.